Nov. 7, 1933. J. E. JEWETT 1,933,556
SEPARATION OF ALCOHOL FROM AMMONIA
Filed Jan. 31, 1930
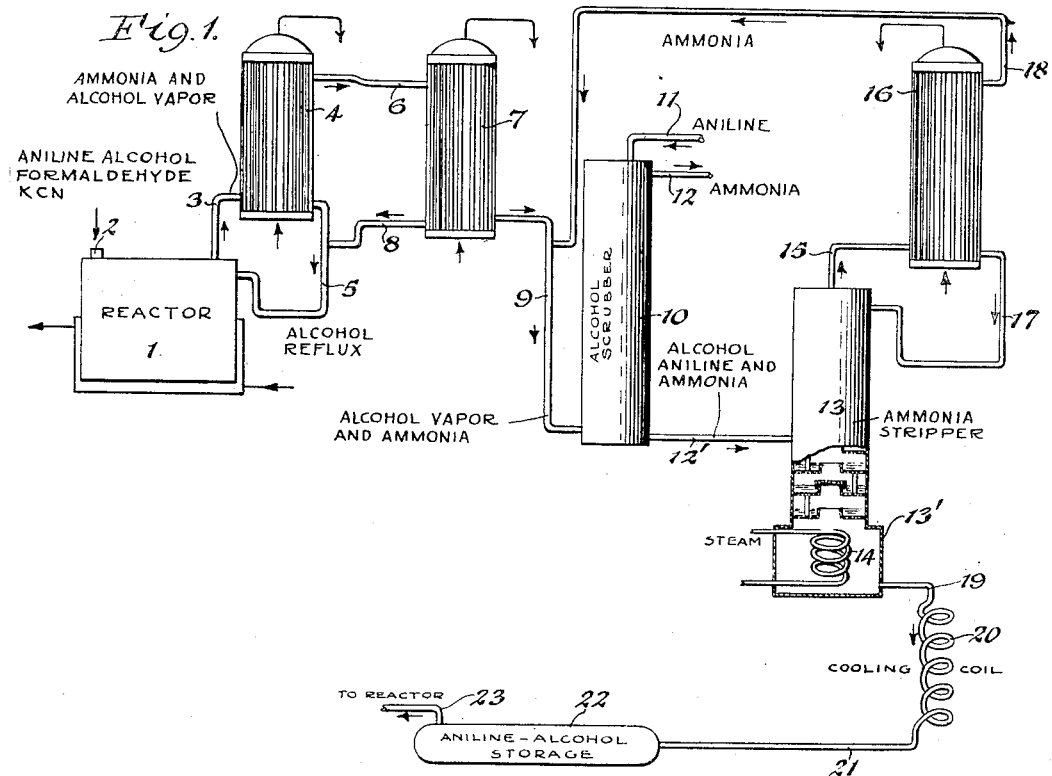

Patented Nov. 7, 1933

1,933,556

UNITED STATES PATENT OFFICE 1,933,556

SEPARATION OF ALCOHOL FROM AMMONIA

Joseph E. Jewett, Buffalo, N. Y., assignor to National Aniline and Chemical Company, Inc., New York, N. Y., a corporation of New York Application January 31, 1930. Serial No. 424,913

14 Claims. (Cl. 260—109)

This invention relates to the process and apparatus for the recovery of alcohol in the preparation of arylglycines by the aldehyde-cyanide process.

The reaction between an arylamine, an aldehyde, and an alkali-metal cyanide in the presence of water, and in the presence of alcohol as a solvent for the production of arylglycines is well known. In this reaction, which is carried out at elevated temperatures, ammonia is produced, which must be eliminated in order to complete the reaction. The reaction ordinarily is carried out in a reactor under a reflux condenser which is vented to permit the escape of ammonia gas. The reflux condenser returns to the reactor the alcohol which volatilizes, with the exception of that portion of alcohol which saturates the ammonia gas and passes off therewith through the vent.

One object of the present invention is the recovery of the alcohol which saturates the ammonia gas in the process above described. Another object is the recovery of alcohol, from the arylglycine process above described, by absorbing the same in an arylamine. Still another object of the invention is the provision of a process and apparatus for the continuous recovery of alcohol vapor from ammonia gas by absorbing the alcohol in an arylamine, and separating the alcohol from the arylamine. These and other objects are accomplished in the practice of the present invention.

An illustrative embodiment of a manner in which the process may be carried out in practice and of the apparatus in which the process may be practiced is shown in the accompanying drawing, wherein Figure 1 diagrammatically shows one modification of the invention and Figure 2 shows another diagrammatic modification of the invention.

Referring to the drawing, the numeral 1 indicates a jacketed reactor into which the aldehyde (for example, formaldehyde), alkali metal cyanide (for example, potassium cyanide), water, arylamine (for example, aniline), etc., and alcohol are introduced through the supply pipe 2.

The reactor is maintained at refluxing temperature, and a vapor mixture which consists essentially of ammonia and alcohol vapors is conducted from the reactor by the pipe 3 to the reflux condenser 4 where the alcohol is condensed, saturated with ammonia, and returned to the reactor through the return line 5. The uncondensed ammonia gas saturated with alcohol vapor passes from the reflux condenser 4 through pipe line 6 to the secondary condenser 7 where further quantities of alcohol are condensed, saturated with ammonia, and returned through the pipe line 8 and return pipe line 5 to the reactor 1. The remaining uncondensed ammonia saturated with alcohol vapor which leaves the secondary condenser 7 through the pipe 9 is conducted to a counter current absorber pipe 10 and is introduced at the bottom thereof. Arylamine (for example, aniline) is introduced at the top of the counter current absorber through the pipe line 11 and flows downward through the absorber while the ammonia gas saturated with alcohol vapor flows upward. The arylamine absorbs the greater part of the alcohol and some ammonia and is removed from the scrubber at the bottom through the pipe line 12′. The ammonia leaves the scrubber at the top through the pipe line 12 and may be conducted into a suitable absorber.

The mixture of arylamine, alcohol and ammonia which leaves the scrubber through the pipe line 12′ is conducted to a column still 13 superposed on a still 13′ which is heated by high pressure steam coils 14 or other suitable means. The still 13′ initially contains a boiling mixture of arylamine (for example, aniline) and alcohol substantially free from ammonia, the vapors from which rise in the column 13, stripping the descending feed mixture from pipe 12′ of ammonia, the required heat being supplied by the heating coils 14. Above the feed plate the column acts as a rectifier, returning the alcohol-arylamine mixture and permitting the ammonia gas to rise and pass out through the vapor line 15. The ammonia gas which passes through line 15 still contains traces of alcohol due to incomplete rectification, and is conducted into the reflux condenser 16 where the condensable vapors are condensed and returned to column 13 through pipe 17. The ammonia gas passes from the condenser through the pipe 18, and since it still contains traces of alcohol, it may be returned to the bottom of the counter current absorber 10 to be run through the absorber again.

The mixture of arylamine and alcohol is discharged from the still 13′ through the pipe 19 and passing through the cooler 20 is directed to the storage tank 22 through the pipe 21. The arylamine and alcohol mixture may be conducted from the storage tank 22 as needed through the pipe line 23 back into the reactor 1.

In the modification of the process and apparatus shown in Figure 2, the hot arylamine and alcohol mixture is not passed through the cooler 20 but is drawn hot from the still 13' by the pump 25 through the discharge line 24, and is pumped through the pipe 26 into the column 27 superposed on the still 26'. The still 26' which is heated by the high pressure steam coil 27' contains boiling arylamine (for example, aniline) the vapors of which rise in the column 27, the lower part of which acts as a stripping column, stripping the descending feed mixture from pipe 26 of alcohol. The upper part of the column above the feed pipe 26 acts as a rectifying column to rectify the alcohol. Alcohol vapors from the top plate together with traces of ammonia present pass out of the column 27 at the top through pipe 28 into the condenser 29. The vapors which enter condenser 29 are totally condensed except for traces of ammonia gas carried over from still 13'. The traces of ammonia gas are conducted from the condenser through the pipe 31 to the pipe 9 for return to the absorber 10. The reflux which returns through pipe 30 still contains some ammonia and is returned to the top of the column. The alcohol is taken off through the pipe 32, which is connected to the column 27 between the supply pipe 26 and reflux return 30 at a point where the concentration of ammonia in alcohol is a minimum, and is conducted to the storage tank 33 where it is held till ready for use as desired.

The column 27 is operated under such conditions that the concentration of ammonia in the alcohol which refluxes and is returned by the return line 30 is reduced considerably further. At a point below the top plate in the column 27 it will be found that the concentration of ammonia in alcohol is less than at the top plates. The alcohol is drawn off from the column through the pipe 32 at that point at which the concentration of ammonia in alcohol is a minimum.

The arylamine which has been substantially stripped of alcohol and ammonia is discharged from the still at the bottom through the pipe line 34 and passes through the cooling coils 35, and may be conducted through the pipe line 36 to the storage tank 37 where it is held until needed. From the storage tank 37 the arylamine may be returned to the counter current absorber to be reused for absorbing alcohol, or it may be conducted into the reactor 1 for use in making arylglycine.

Suitable arylamines for use in the absorber are aniline, o-toluidine, m-toluidine or other liquid arylamines. Solid arylamines also may be employed, in which case the counter current absorber is replaced by a tower filled with the solid amine, which broadly may be considered as an absorber.

The invention is not limited to the details of the process and apparatus above described, since changes will be apparent to one skilled in the art and may be made without departing from the scope of the invention. It is therefore intended that all matter contained in the above description shall be interpreted as illustrative of the invention and not in a limiting sense, except as defined by the claims.

Having described my invention, what I claim as new and desire to secure by Letters Patent is:

1. The process which comprises reacting an aldehyde, an arylamine, water, and an alkali metal cyanide in the presence of alcohol as a solvent, heating the reaction mixture to distill off vapors of alcohol and ammonia, cooling the vapors to condense alcohol, returning the condensed alcohol to the reaction, conducting the remaining vapors containing ammonia saturated with alcohol through the arylamine to absorb the alcohol, rectifying the resulting mixture of alcohol, arylamine and entrained ammonia to remove the ammonia therefrom, and conducting the remaining mixture of alcohol and arylamine to the reaction.

2. The process which comprises reacting an aldehyde, an arylamine, water, and an alkali-metal cyanide in the presence of alcohol as a solvent, heating the reaction mixture to distill off vapors of alcohol and ammonia, cooling the vapors to condense alcohol, conducting the remaining vapors containing ammonia and alcohol through an arylamine to absorb the alcohol, rectifying the resulting mixture of alcohol, arylamine and entrained ammonia to remove ammonia therefrom, and rectifying the remaining mixture of alcohol, arylamine and residual ammonia to separate the alcohol, arylamine and ammonia.

3. The process for the recovery of alcohol which comprises passing ammonia gas saturated with alcohol vapor through aniline whereby the alcohol and some ammonia are absorbed in the aniline, rectifying the mixture of aniline, alcohol and ammonia to distill off the ammonia, and rectifying the mixture of alcohol, aniline and residual ammonia to separate the alcohol, aniline and ammonia.

4. The process which comprises reacting formaldehyde, aniline, water and potassium cyanide in the presence of alcohol as a solvent, heating the reaction mixture to distill off vapors of alcohol and ammonia, cooling the vapors to condense alcohol, conducting the remaining vapors containing ammonia and alcohol through aniline to absorb the alcohol, rectifying the resulting mixture of alcohol, aniline and entrained ammonia to remove ammonia therefrom, and rectifying the remaining mixture of alcohol, aniline and residual ammonia to separate the alcohol, aniline and ammonia.

5. The process which comprises reacting an aldehyde, an arylamine, water, and an alkali metal cyanide in the presence of alcohol as a solvent, heating the reaction mixture to distill off vapors of alcohol and ammonia, contacting the vapors with an arylamine to remove alcohol, and reacting an aldehyde, water, and an alkali metal cyanide with the alcohol-arylamine mixture.

6. The process which comprises reacting an aldehyde, an arylamine, water, and an alkali metal cyanide in the presence of alcohol as a solvent, heating the reaction mixture to distill off vapors of alcohol and ammonia, contacting the vapors with an arylamine to remove remaining alcohol, separating entrained ammonia from the alcohol-arylamine mixture thereby produced, and conducting the remaining alcohol-arylamine mixture to the reaction.

7. The process which comprises reacting an aldehyde, a liquid arylamine, water, and an alkali metal cyanide in the presence of alcohol as a solvent, heating the reaction mixture to distill off a vapor mixture containing alcohol and ammonia, absorbing alcohol from the vapor mixture in a liquid arylamine, and forming a reaction mixture containing the resulting alcohol-arylamine mixture, an aldehyde, water, and an alkali metal cyanide.

8. The process which comprises reacting an aldehyde, aniline, water, and an alkali metal cyanide in the presence of alcohol as a solvent, heating the reaction mixture to distill off a vapor mixture containing alcohol and ammonia, cooling the vapor mixture to condense alcohol, returning the condensed alcohol to the reaction mixture, passing the residual vapor mixture through aniline to absorb alcohol, rectifying the resulting alcohol-aniline mixture to remove entrained ammonia, and forming a reaction mixture containing the resulting alcohol-aniline mixture, an aldehyde, water, and an alkali metal cyanide.

9. The process for the selective recovery of alcohol from a vapor mixture of ammonia and alcohol which comprises contacting the vapor mixture with an arylamine, whereby alcohol is absorbed.

10. The process for the recovery of alcohol which comprises contacting a vapor mixture of ammonia and alcohol with an arylamine, whereby alcohol is absorbed, and separating alcohol from the resulting alcohol-arylamine mixture.

11. The process for the recovery of alcohol which comprises passing a vapor mixture of ammonia and alcohol into a liquid arylamine, whereby alcohol is absorbed, separating entrained ammonia from the resulting alcohol-arylamine mixture, and rectifying the resulting alcohol-arylamine mixture to separate the alcohol and arylamine.

12. The process for the recovery of alcohol which comprises cooling a vapor mixture containing ammonia saturated with alcohol to condense alcohol, passing the remaining vapor mixture through aniline to absorb alcohol, rectifying the resulting mixture of alcohol, aniline and entrained ammonia to remove ammonia, and rectifying the remaining alcohol-aniline mixture to separate the alcohol and ammonia.

13. The process for the recovery of alcohol which comprises scrubbing a vapor mixture of ammonia and alcohol with aniline to remove alcohol, separating alcohol and aniline from the resulting mixture, and employing the aniline in a repetition of the scrubbing operation.

14. The process for the recovery of alcohol which comprises scrubbing a vapor mixture of ammonia and alcohol with aniline to remove alcohol, rectifying the resulting mixture of alcohol, aniline and entrained ammonia to separate ammonia, rectifying the remaining alcohol-aniline mixture to separate the alcohol and aniline, and employing the aniline in a repetition of the scrubbing operation.

JOSEPH E. JEWETT.